3,466,783
FISHING ROD
Lawrence W. Priebe, Jr., Columbia, S.C., assignor to Columbia Products Company, Columbia, S.C., a corporation of South Carolina
Filed Sept. 11, 1967, Ser. No. 666,842
Int. Cl. A01k 87/06, 87/00
U.S. Cl. 43—18        7 Claims

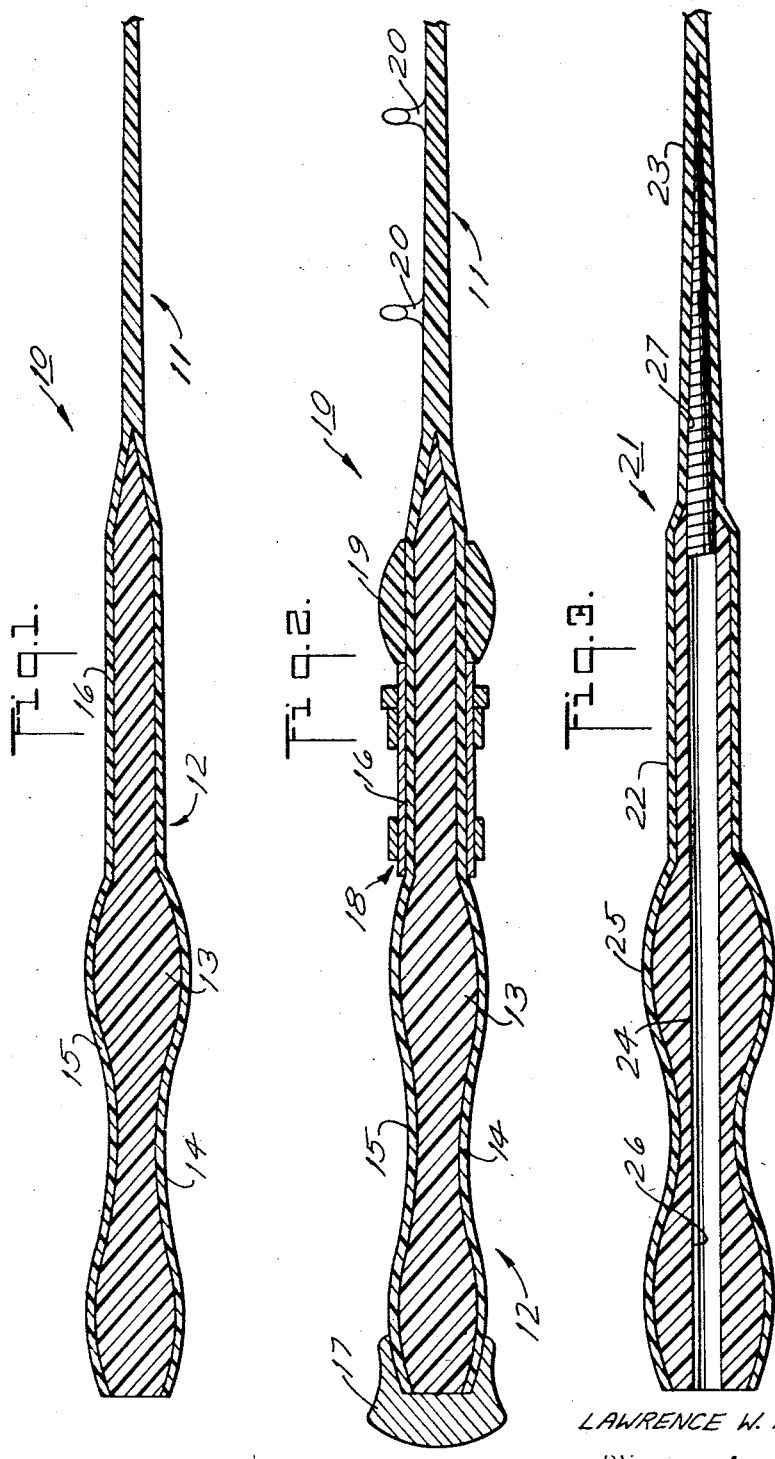
Sept. 16, 1969     L. W. PRIEBE, JR     3,466,783
FISHING ROD
Filed Sept. 11, 1967
INVENTOR.
LAWRENCE W. PRIEBE, JR.
BY
ATTORNEYS United States Patent Office 3,466,783
Patented Sept. 16, 1969

ABSTRACT OF THE DISCLOSURE

The fishing rod is made to include an integrated handle portion and tapered blade portion. The handle portion comprises a sheath made of the same glass fiber reinforced plastic material as the blade portion and within the sheath is disposed either a solid core or a hollowed core of foam material. The handle portion is shaped to be of larger diametric extent than the blade portion to receive a reel seat assembly.

---

This invention relates to a unitary fishing rod. More particularly, this invention relates to a one-piece fishing rod made of glass fiber reinforced plastic and having an integral handle.

Heretofore, fishing rods, in the simplest form, have been utilized as a one-piece member such as a wood stick with a line and hook arrangement tied to one end. Such forms of fishing rods, however, have been limited in use since the fishing lines could only be of relatively short length. In order to overcome such a shortcoming, fishing rods have been constructed with reel seat assemblies capable of playing out and winding up relatively great lengths of fishing line. However, because such fishing rods have generally been subjected to substantial flexural forces in use, these fishing rods have been made with separate blades and handles so that each separate member could be made to meet the requirements of use to which it is subjected. Due to the separate construction of the blades and the handles, various types of securing techniques have been used to assemble a blade and handle together into a rod. In several cases, the blade has been fastened to the handle by means of a push-fit ferrule. In other cases, the blade has been bonded in an axial hole drilled in the end of the handle. In either situation, the techniques for securing the blades to the handles not only have added to the cost of the rod but also have introduced a weakness in flexural strength at the joint in the completed rod structure which frequently has resulted in breakage of the blade or handle at the joint, or in failure of the bonding glue joint when the rods have been bent during the landing of a fish. In order to avoid some of these disadvantages, some handles have been drilled the full length to permit the butt end of the blade to extend the full length of the handle. However, this is considerably more expensive due to the difficulty of drilling such a hole in a concentric manner and of matching the components together. Also, since such an assembly still requires a securing of various components together, it has been time-consuming to manufacture.

Accordingly, it is an object of the invention to eliminate any joint between a blade and handle of a fishing rod to construct a one-piece fishing rod.

It is another object of the invention to provide a simple accurate technique of making a fishing rod.

It is another object of the invention to provide a sturdy and relatively trouble-free fishing rod.

It is another object of the invention to increase the useful life of a fishing rod while avoiding the need for constant maintenance.

It is another object of the invention to increase the strength of a fishing rod.

It is another object of the invention to provide a fishing rod with a smooth continuous surface.

Briefly, the invention provides a unitary fishing rod having integrated blade and handle portions. The blade portion and handle portion are formed with smooth continuous exterior surfaces so as to impart a continuous surface to the fishing rod. In addition, the blade portion and handle portion are formed of glass fiber reinforced plastic material so as to impart relatively high strength to the fishing rod while eliminating any possiblity of swelling or warpage in the fishing rod due to moisture.

In one embodiment, the fishing rod has an handle portion which is provided with a solid core of foam material and a sheath of glass fiber reinforced plastic. The blade portion is formed as a tapered round rod of the same glass fiber reinforced plastic as the sheath of the handle portion.

In another embodiment, the fishing rod has a handle portion which is provided with a hollowed core of foam material and a sheath of glass fiber reinforced plastic. The blade portion, which is also of the same material as the sheath of the handle portion, is, however, formed with a central bore which communicates with the hollowed core in the handle portion and tapers to a point spaced from the tip of the blade.

In either of these embodiments, the exterior sheath surface of the handle portions is formed to accept a reel seat assembly and, where used, a foregrip. The blade portions are provided with suitable guide eyelets for a fishing line.

In order to make the fishing rod, the foam core is concentrically surrounded by a plurality of longitudinally parallel resin impregnated glass fiber strands or rovings. The glass fibers are cut and layered to follow the contour of the core and to extend from the core to define the tapered contour of the blade portion. Thereafter, the resin is cured so that the structure takes on a rigid self-supporting shape of the fishing rod.

These and other objects and advantages will become more apparent from the following detailed description taken in conjunction with the accompanying drawings, in which:

FIG. 1 illustrates a one-piece fishing rod of the invention in a fragmentary cross-sectional view;

FIG. 2 illustrates a view similar to FIG. 1 with a reel seat assembly, foregrip, end cap and guide eyelets in place on the fishing rod of FIG. 1; and FIG. 3 illustrates a fragmentary cross-sectional view of another embodiment of the invention with a hollow handle portion and tapered bore blade portion.

Referring to FIG. 1, a fishing rod 10 is constructed with a tapered blade portion 11 and a handle portion 12. The blade portion 11 has a butt end at the largest cross-section dimension which is integrally connected to the handle portion 12. The handle portion 12 includes a shaped solid core 13 of foam material, such as a polyurethane foam, and a sheath 14 concentrically surrounding and contacting the core 13 in an unstressed manner. The sheath 14 blends integrally into the material of the blade portion 11 at the butt end of the blade portion 11 in a smooth transitional manner.

The blade portion 11 and the sheath 14 are made of the same material in an integral manner. Preferably, the blade portion 11 and the sheath 14 are made of a glass fiber reinforced plastic in order to provide strength and rigidity to the fishing rod 10. In addition, the plastic material imparts warp-resistant, swell-resistant, and corrosion-resistant characteristics to the fishing rod 10 against the effects of water.

Referring to FIG. 2, the handle portion 12 includes a rear grip section 15 which is contoured in a smooth convoluted manner and a forward reel seat receiving section 16 which is contoured in a smooth cylindrical manner. The free end of the handle portion 12 is shaped to receive an end cap 17 of resilient material such as rubber which serves to seal the open end of the handle portion against passage of foreign materials into the foam core 13. In addition, the end cap 17 serves as a protective cover for the end edges of the sheath 14. The reel seat receiving section 16 receives a reel seat assembly 18 of known structure in a manner wherein the reel seat assembly 18 is bonded or otherwise fastened to the handle portion 12. In addition, the reel seat receiving section 16 receives a foregrip 19, for example, of a cork material in a known shape, in a bonded or otherwise secured manner. The blade portion 11 has a plurality of aligned guide eyelets 20 secured thereon in a known manner, such as, by bonding, for guiding of a fishing line (not shown).

In order to make the fishing rod 10, the solid core 13 which has been shaped to the desired contour, such as by mechanical means or by molding, is positioned on a suitable support and a plurality of resin-impregnated glass fibers are laid longitudinally around the core 13. The fibers are sized so as to extend from the core 13 to form the solid blade portion 11 and are cut at selected points from the core 13 so as to impart a taper to the formed blade portion. This assembly is then cured under heat to harden the resin into a monolithic structure. The resulting structure provides the fishing rod 10.

Referring to FIG. 3, in order to reduce the amount of materials used without reducing flexural strength, the fishing rod 21 is formed with a hollowed handle portion 22 and a partially hollowed blade portion 23. The handle portion 22 is similar to the above-described handle portion 12 in that such includes a core 24 of foam material and a sheath 25 overlying the core 24. In addition, the core 24 is provided with a bore 26 running the longitudinal length of the core 24 on the axis of the fishing rod 21. The blade portion 23 is also similar to the above-described blade portion 11. In addition, the blade portion 23 has a tapered bore 27 which extends from the butt end of the blade portion up to a point approximately six inches from the tip of the blade portion, while being in coaxial alignment with the bore 26 in the core 24.

In order to make the fishing rod 21, a quantity of resin-impregnated glass fiber rovings are strung in a suitable machine to form a sheath having a thickness which is equal to the thickness of the outermost portion of the sheath 25 of the completed structure. The hollowed core 24 which is shaped to the desired configuration is then mounted on one end of a steel mandrel (not shown) and a resin-impregnated glass fiber thread is wound on the remainder of the mandrel. Thereafter, the mandrel is positioned within the sheath of glass fibers and both are fed through a resiliently restricted opening such as a rubber-defined orifice. The glass fibers of the sheath are thus pressed against the core and wound thread on the mandrel to follow the longitudinal contour of the core and thread. During this pressing operation, the amount of roving material in the sheath is reduced by cutting the rovings at a point starting near the butt end of the blade portion and continuing to the tip of the blade portion. This allows the thickness of the sheath in the hollowed section of the blade portion to be substantially maintained at a constant dimension. After the rovings are pressed onto the core and thread, tapes, such as cellophane tapes, are wrapped in overlapping manner around the sheath of rovings so that the sheath conforms to the shape of the core. Next, the wrapped unit is cured in a suitable oven in a manner, for example, which includes heating of the wrapped unit from room temperature to 200° F. uniformly over a two-hour period, maintaining the temperature at 200° F. for two more hours and then cooling to room temperature. Thereafter, the cellophane tapes are removed and the mandrel is pulled from the completed fishing rod. The completed fishing rod 21 thus has a blade portion with an inner layer of helically wound glass fiber thread and an outer concentric layer of longitudinally disposed glass fiber rovings. A reel seat assembly, foregrip, eyelets and end cap, as described above, can then be mounted on the fishing rod 21.

In these above embodiments, the handle portions are made with a pair of large diameter portions, for example, of 1¼ inch diameter, a necked down portion of, for example, ⅞ inch diameter between the large diameter portions and a reel seat receiving portion of, for example, ¾ inch diameter. The blade portions are tapered from the handle portions and are of less diametric extent. The thickness of the sheaths in the handle portions varies from $\frac{1}{32}$ inch at the large diameter portions to about $\frac{1}{16}$ inch at the smaller diameter portions. Further, the thickness of the sheath in the hollow blade portion of the latter embodiment is approximately $\frac{1}{16}$ inch.

The invention provides a fishing rod which is of one piece so as to eliminate the disadvantages attendant with the assemblying together of a multi-member fishing rod. In addition, the fishing rod of the invention is of relatively light weight while being relatively strong in flexural strength so as to resist the various flexural stresses imposed on the fishing rod, especially in deep sea fishing.

Because the fishing rod is made of glass fiber reinforced plastic, the rod is substantially maintenance-free since the rod is corrosion-resistant as well as impervious to water. Thus, the fishing rod of the invention is able to provide a relatively long life of use.

What is claimed is:

1. A fishing rod having a handle portion and a blade portion, said handle portion having a contoured rear grip section of convoluted contour and a forward reel seat receiving section of cylindrical contour, and including a core of a contour to impart said convoluted contour to said handle portion and a sheath concentrically surrounding said core, said sheath being integrally formed with said blade portion and being of the same material as said blade portion.

2. A fishing rod as set forth in claim 1, wherein said core has a longitudinal bore therethrough and said blade portion has a tapered bore along a portion of the length of said blade portion, said longitudinal bore and said tapered bore communicating with each other.

3. A fishing rod as set forth in claim 1, wherein said blade portion is tapered in a direction from said handle portion.

4. A fishing rod as set forth in claim 3, wherein said blade portion includes a tapered bore along a portion of the length thereof and said core includes a longitudinal bore in communication with said tapered bore.

5. A fishing rod as set forth in claim 1, wherein said sheath and blade portion are made of glass fiber reinforced plastic.

6. A fishing rod as set forth in claim 5, wherein said core is a polyurethane foam.

7. A fishing rod having a handle portion for receiving a reel seat assembly and a blade portion of less diametric extent than said handle portion, said handle portion including a core of foam materal and a sheath surrounding said core, said sheath blending into said blade portion in a smooth transitional manner, said core having a longitudinal bore therethrough and said blade portion having a tapered bore along a portion of the length of said blade portion, said longitudinal bore and said tapered bore communicating with each other, and said blade portion including an inner layer of helically wound glass fiber thread and an outer concentric layer of longitudinally disposed glass fiber rovings.

References Cited

UNITED STATES PATENTS

| 1,961,968 | 6/1934 | Heddon | 43—18 |
| 2,571,717 | 10/1951 | Howald et al. | 43—18 |
| 3,034,246 | 5/1962 | Davidson | 43—18 X |

FOREIGN PATENTS

| 1,355,027 | 2/1964 | France. |
| 67,261 | 9/1957 | France. |
| | | (1st addition to No. 1,072,867) |

SAMUEL KOREN, Primary Examiner
DANIEL J. LEACH, Assistant Examiner

U.S. Cl. X.R.

43—23